Jan. 22, 1952     A. GIRZ     2,583,094
TAPER THREADING MACHINE
Filed April 24, 1948     4 Sheets-Sheet 1
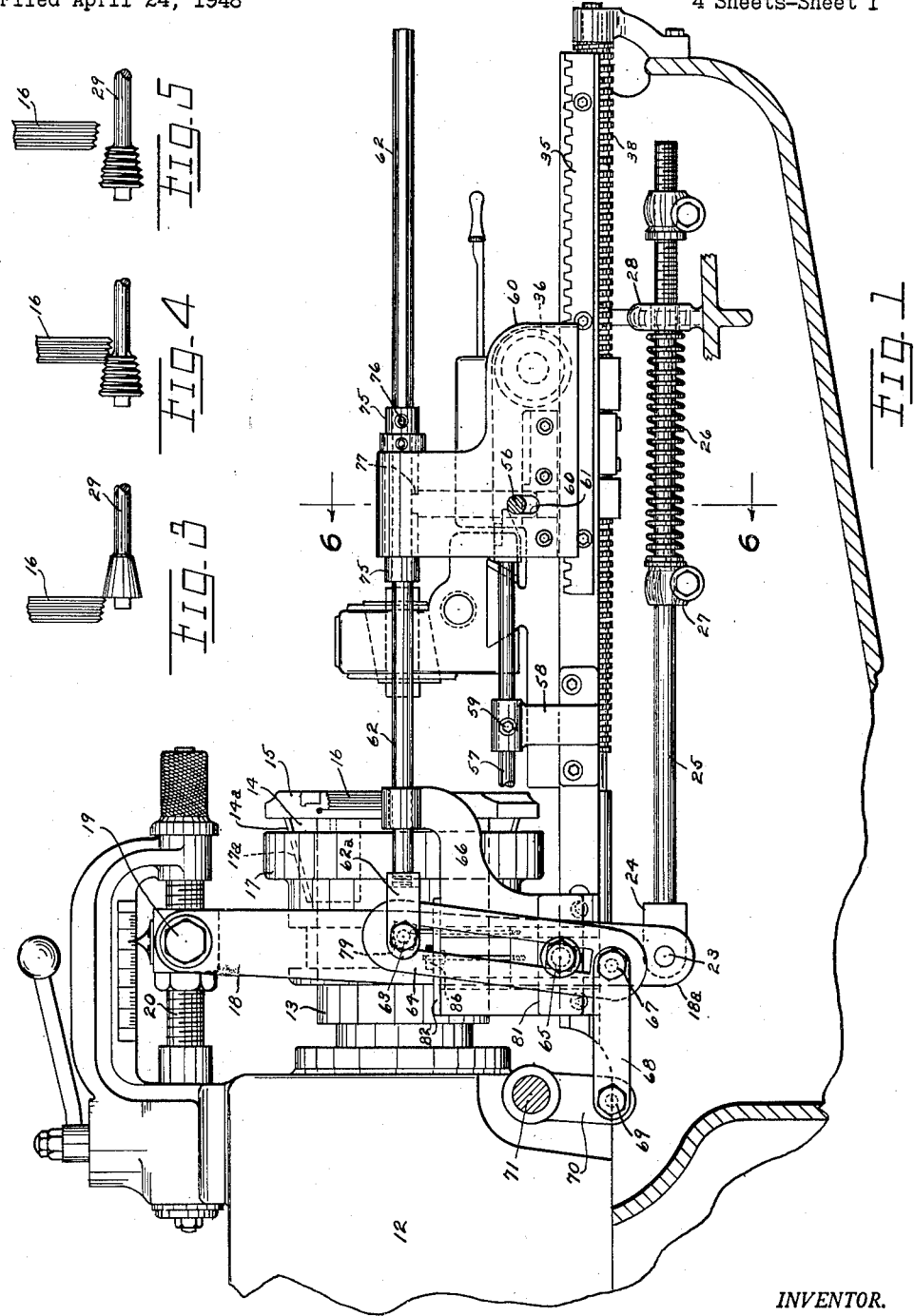
INVENTOR.
ADOLPH GIRZ
BY
Hyde, Meyer, Baldwin & Doran
ATTORNEYS Jan. 22, 1952 A. GIRZ 2,583,094
TAPER THREADING MACHINE
Filed April 24, 1948 4 Sheets-Sheet 2
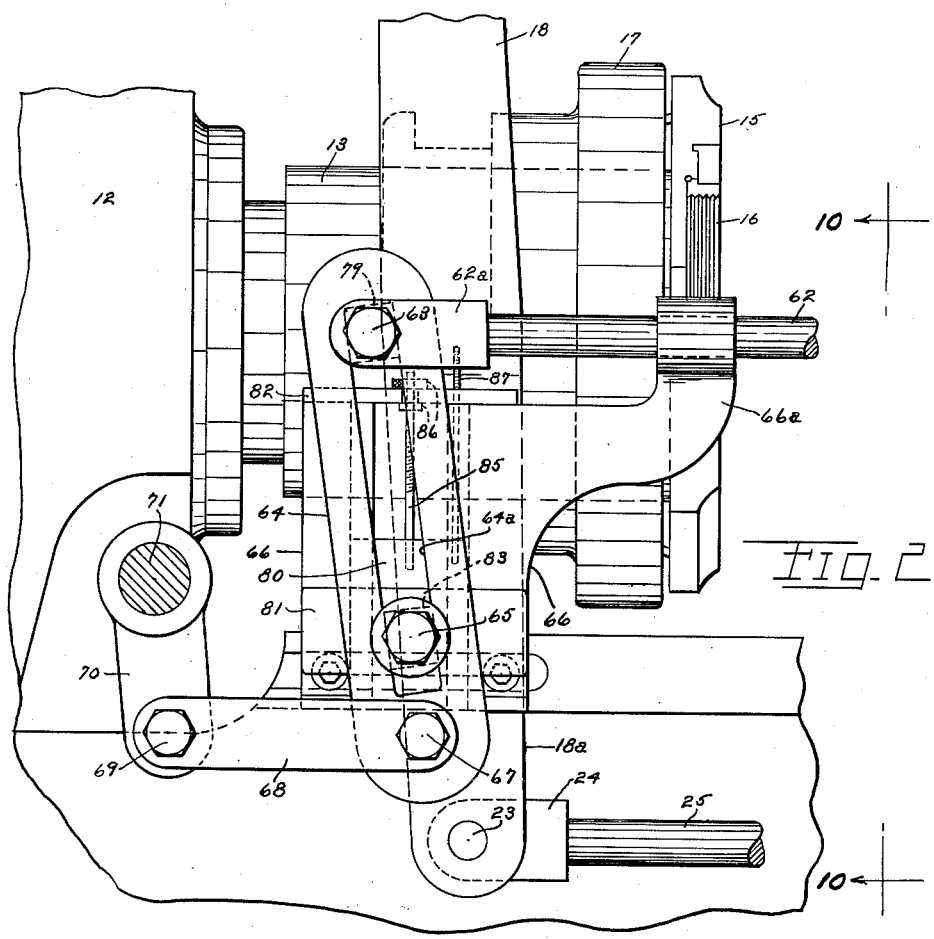
INVENTOR.
ADOLPH GIRZ
BY
Hyde, Meyer, Baldwin & Doran
ATTORNEYS

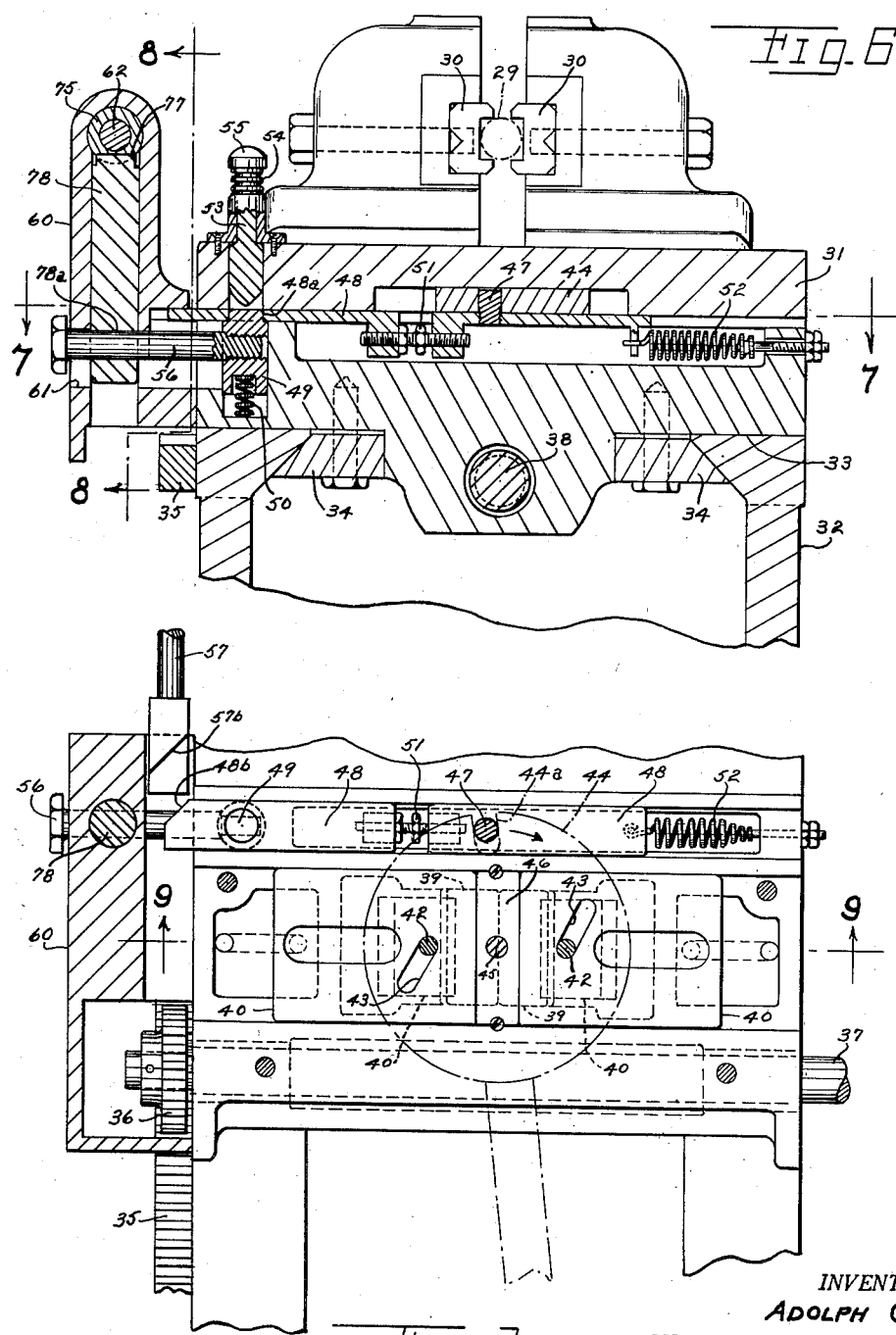

INVENTOR.
ADOLPH GIRZ
BY
Hyde, Meyer, Baldwin & Doran
ATTORNEYS

Patented Jan. 22, 1952

2,583,094

UNITED STATES PATENT OFFICE 2,583,094

TAPER THREADING MACHINE

Adolph Girz, Cleveland, Ohio, assignor to The Hill Acme Company, Acme Machinery Division, Cleveland, Ohio, a corporation of Ohio Application April 24, 1948, Serial No. 23,085

6 Claims. (Cl. 10—89)

This invention relates to improvements in taper threading machines and more particularly to one in which the taper may be varied.

One of the objects of the present invention is to provide improvements in a machine of the type wherein the work piece is fed longitudinally and axially of a rotating head which carries radially movable die chasers.

In a machine of the type described, one of the improvements includes novel means for feeding the dies radially inwardly as the work piece progresses longitudinally.

Another object of the present invention is to provide in a machine of the type described means for moving the dies progressively radially inwardly while the work piece moves longitudinally together with readily adjustable means for varying the rate at which the dies are fed inwardly so as to vary the taper which is cut by the dies.

Another object of the present invention is the provision in a machine of the type described of a carriage for moving the work piece longitudinally, with a lead screw and lead screw nut controlling the position of the carriage. In such a combination, I provide a novel connection between a throwout rod and the lead screw nuts, whereby the carriage is positively released from the lead screw at the termination of the cutting of a taper thread without any possibility of failure.

Other features of my invention reside in the arrangement and design of the parts for carrying out their appropriate functions.

Other objects and advantages of my invention will be apparent from the accompanying drawings and descriptions and the essential features will be set forth in the appended claims.

In the drawings,

Fig. 1 is a side elevational view of a portion of a threading machine equipped with my invention, portions thereof being broken away to more clearly show the construction;

Fig. 2 is an enlarged fragmental view taken toward the left end of Fig. 1 and showing a slightly different position of the parts;

Figs. 3, 4 and 5 are diagrammatic views showing the progress of a chaser while cutting a taper thread according to my invention;

Fig. 6 is an enlarged fragmental sectional view taken along the line 6—6 of Fig. 1;

Fig. 7 is a fragmental sectional view taken along the line 7—7 of Fig. 6;

Fig. 8 is a fragmental sectional view taken along the line 8—8 of Fig. 6;

Fig. 9 is a fragmental sectional view taken along the line 9—9 of Fig. 7;

Fig. 10 is a fragmental sectional view taken along the line 10—10 of Fig. 2 with a portion of the cutting head broken away to more clearly show the construction; while

Figure 10:
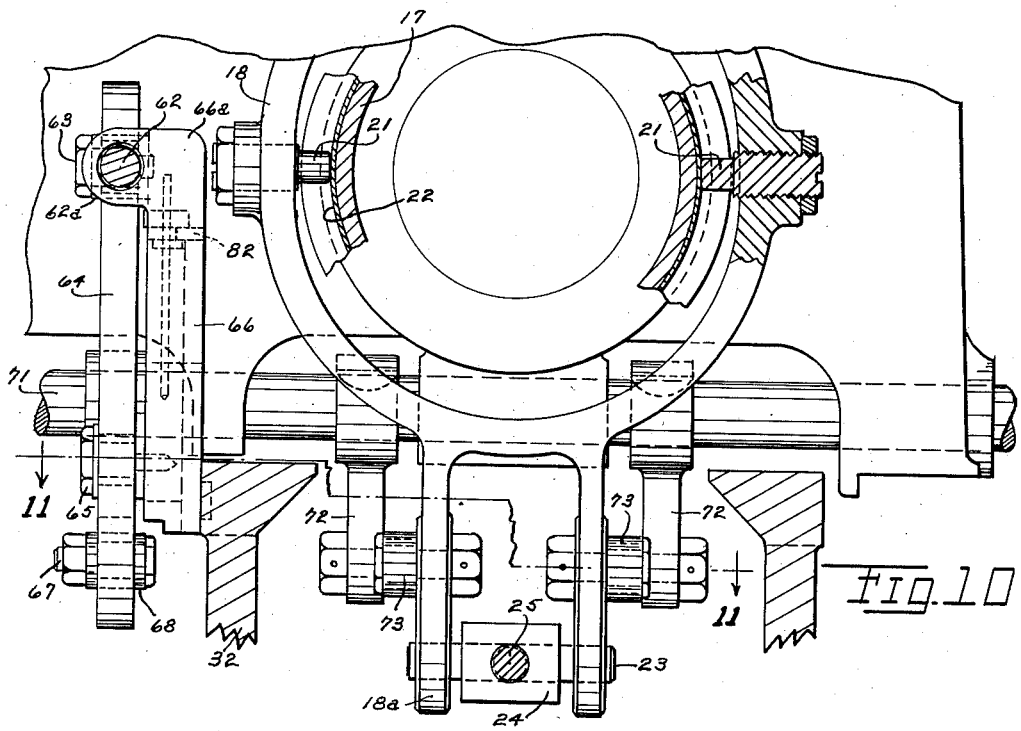

While my invention might be adapted to various types of machines, I have chosen to show the same as applied to a threading machine die head of the type described and claimed in U. S. Patent No. 2,292,788, granted August 11, 1942, to Merle W. Lamprecht, to which reference may be had for a clearer understanding of the die head, if necessary.

It is sufficient to state here that in the above mentioned Lamprecht patent, the customary mechanism in the housing 12 rotates a barrel 13 in which are mounted a plurality of die slides 14 which are mounted in the barrel for radial movement outwardly and inwardly by sliding in T-shaped pockets in the barrel. On each of these slides is mounted a die holder 15 which carries a thread chaser die 16. A die control ring 17 is movable axially of the head, while the same is rotating, for controlling the position of the dies. The control is arranged by means of an inclined surface 17a in the interior of the control ring 17 which engages a similar tapered surface 14a on each of the die slides 14. As viewed in Figs. 1 and 2, as the control ring 17 moves toward the right, it causes the dies 16 to move radially inwardly. The control of ring 17 is arranged by means of a yoke 18 which has a relatively fixed upper pivot 19 which, however, is adjustable along the threaded bar 20 by means recited in the above mentioned Lamprecht patent. The engagement between the yoke 18 and the control ring 17 is more clearly shown in Fig. 10, wherein pins 21 carried by the yoke engage in an annular groove 22 of the ring 17. Extending downwardly from the yoke is a bracket 18a integral therewith which, at its lower end, carries a pin 23 upon which is pivotally mounted a clevis 24 secured to a spring rod 25. Surrounding this rod is a helical spring 26 which is held between a collar 27 fixed on the rod and a stop 28 fixed on the bed of the machine. It results from this construction that after the control ring 17 has been fed toward the right, as viewed in Figs. 1 and 2, for cutting a taper thread by means later described, the spring 26 will be loaded so that upon release of the control ring 17, the spring 26 will move rod 25 toward the left, as viewed in Figs. 1 and 2, causing movement of control ring 17 toward the left, thus causing movement of the dies 16 radially outward to release the work.

I have chosen to illustrate my invention as used in cutting a taper thread on a piece of round stock 29 preformed to the shape shown in Fig. 3 for use as a stay bolt or the like. As viewed in Figs. 3, 4 and 5, the stock 29 is fed toward the left while the dies 16 are moved radially inward from the position shown in Fig. 3 to the position shown in Fig. 4 where the cut is finished and to the position shown in Fig. 5 when the dies are released and moved radially outward as impelled by the spring 26 just described. The bar 29 is clamped in jaws 30 of a carriage 31 which is mounted in the usual manner for travel longitudinally of the bed 32 on the ways 33. The carriage is held on the ways by the gibs 34. By means of a rack 35 fixed to the bed and a pinion 36 engaged therewith under the control of shaft 37 upon which a hand wheel is mounted, the carriage may be moved manually along the bed of the machine in the usual manner. The automatic travel of the carriage 31 along the bed 33 is controlled by the usual lead screw 38 which is rotated by the mechanism in the head stock 12 in the usual manner. Referring to Fig. 9, the carriage is locked to the lead screw by the usual lead screw nuts 39 which are fixed to the nut holders 40. These nut holders are mounted in the usual manner for sliding movement crosswise of the bed and are normally urged away from each other by means of the spring 41. The position of the nut holders 40 is controlled by means of pins 42 which extend upwardly into slots 43 in a cam plate 44 which is rotatably mounted on a center screw 45 which in turn is fixed in a center plate 46 of the carriage. The cam plate 44 may be locked in the position of Fig. 7 by means of a pin 47 controlled by a lock slide 48. The pin 47 engages in a notch 44a in the cam plate 44. The slide 48 has an opening 48a through which enters a lock pin 49 when the opening 48a is in registration, the lock pin being impelled by a small spring 50 beneath it as clearly shown in Fig. 6. For adjustment of the pin 47 and the slide 48, the slide is made in two parts connected together by an adjusting screw 51 which has right and left hand thread connections with the two halves of the slide. The slide 48 is normally impelled toward the right, as viewed in Figs. 6 and 7, by means of the helical spring 52 which is secured between the slide and the main portion of the carriage.

Manual and automatic means are provided for releasing the lock pin slide 48. As clearly shown in Fig. 6, the manual release consists of a pin 53 positioned directly above the lock pin 49 and normally urged upwardly by means of a spring 54. If at any time the operator desires to release the carriage from the lead screw 38, he merely strikes the knob 55 causing the pin 53 to drive lock pin 49 downwardly whereupon the spring 52 will cause the pin 47 to rotate cam plate 44 in the direction of the small arrow of Fig. 7 thus causing the inclined slots 43 to move the pins 42 radially away from each other so as to move the lead screw nuts 39 to the position of Fig. 9. The automatic means is connected with the lock pin stud 56 which is threaded into the lock pin 49 at right angles to its axis and extends laterally outwardly, as clearly shown in Figs. 6, 7 and 8. As shown in these views and in Fig. 1, a throwout rod 57 is fixed in a bracket 58 on the bed of the machine by means of a set screw 59. The end of this rod, as clearly shown in Fig. 8, is provided with an end cam 57a tapering in a vertical direction and adapted to ride over the stud 56 as the carriage 31 is fed toward the end of the throwout rod. The cam 57a will then cause the stud 56 to move from its position in the upper end of a slot 61 in a bracket 60 fixed to the carriage (as shown in Fig. 6) to a position in the lower portion of the slot 61, as shown in Fig. 8. This downward movement of the stud 56 carries the lock pin 49 with it and releases the slide 48 so as to permit spring 52 to move the cam plate 44 and release the lead screw nuts 39 in the manner previously described.

If the release of the lead screw nuts is not accomplished in the manner above described, perhaps due to the failure of spring 52, more positive means is provided for insuring the release of the lead screw nuts. This comprises a cam 57b, clearly seen in Figs. 7 and 8, at the free end of the throwout rod 57. This cam tapers in a horizontal direction and is adapted to engage a cam 48b on the end of the slide 48. Obviously, as these parts approach each other from the position shown in Fig. 7, if the movement is carried far enough the fixed cam 57b will work against the movable cam 48b so as to cause the slide 48 to move toward the right as shown in Fig. 7 and to cause the release of the lead screw nuts through the mechanism previously mentioned.

The means for automatically producing a thread of the taper selected will now be described.

Referring to Fig. 1, the bracket 60 which is connected with the carriage 31 has a driving relationship with a lever control rod 62 which in turn is pivotally connected at 63 with a taper control lever 64 which in turn has a pivot 65 on a bracket 66 which is fixed to the bed. The lower end of lever 64 is pivotally connected at 67 with a link 68 which is pivotally connected at 69 to a lever 70 which in turn is pivotally mounted on the bed of the machine at 71. As clearly shown in Figs. 10 and 11, the pivot shaft 71 carries a pair of crank arms 72 which carry at their lower ends a pair of links 73 extending forwardly and pivotally connected by bolts 74 with the bracket 18a of the yoke 18 previously mentioned. Referring to Fig. 1, it results from this construction that as the carriage 31 and the bracket 60 move toward the left, while feeding the work piece 29 into the rotating die head, the rod 62 moves toward the left thus slowly moving lever 64 in a counterclockwise direction about its pivot 65. This movement is transmitted through link 68 to the arm 70 causing it to move in a counterclockwise direction and causing shaft 71 to move arms 72 in a counterclockwise direction thus pushing links 73 forwardly and carrying the downwardly extending arms or brackets 18a of the yoke 18 forwardly. The yoke pivots about its upper pivot 19 and carries the control ring 17 forward so as to slowly feed the dies 16 inwardly against the work. This causes the dies 16 to travel from the position of Fig. 3 to the position of Fig. 4 cutting a taper thread from the large diameter toward the smaller diameter. When the thread has been completed then the throwout rod 57 acts upon the slide 48 to release the lead screw nuts 39 in the manner previously described so as to terminate the cut. This releases the rod 62 from the carriage 60 in a manner presently to be described thus leaving the spring 26 on the spring rod 25 free to return the control ring 17 toward the left as viewed in Fig. 1 and permitting the dies 16 to open to the position shown in Fig. 5. This prevents the dies cutting into the body of the rod 29.

The connection between the bracket 60 and the lever control rod 62 will now be described.

A driving sleeve 75 is adjustably positioned on the rod 62 and retained there by means of a set screw 76. This adjustment is made so as to position the carriage 31 in the desired relationship to the threading head after which the set screw 76 is secured in position. The sleeve 75 is provided with a notch 77 into which enters the square nose of the upper end of a vertical pin 78, the lower end of which is provided with a bore 78a to receive the stud 56. When the carriage is driving the rod 62, the pin 78 is in the position shown in Figs. 1 and 6 with its nose entering the notch 77 so as to drive the sleeve 75 and the rod 62. When the throwout rod 57 has acted, the pin 78 is drawn downwardly as shown in Fig. 8 so as to release it from the notch 77 and disconnect the carriage and its bracket 60 from the rod 62.

The various connections of lever 64 will now be described.

Figure 11:
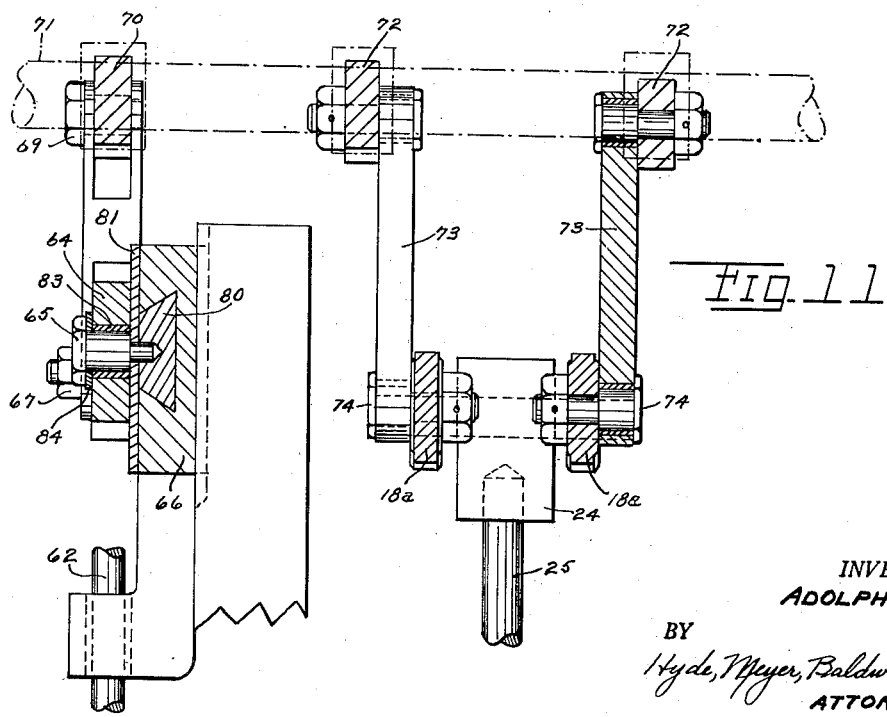
Fig. 11 is a fragmental sectional view taken along the line 11—11 of Fig. 10.

A clevis 62a on the end of rod 62 is secured by a bolt at the pivot 63, this bolt having a smooth cylindrical surface which fits into a sliding box 79 adapted to slide in the slot 64a located centrally of the lever 64. It will be noted that the bracket 66 has an arm 66a which is provided with a bore through which the rod 62 is adapted to slide. This fixes the rod 62 for straight line motion which is accommodated to the arcuate motion of lever 64 by the sliding of the box 79 in the slot 64a. Referring to Figs. 2, 10 and 11, the fixed pivot 65 of the lever 64 is provided by means of a stud bolt which is threaded into a sliding wedge 80 which fits in dovetail ways in bracket 66. A face plate 81 holds the wedge 80 in its ways and a top plate 82 fixed to the top of bracket 66 by means not shown closes the top of the ways. The stud 65 has a cylindrical portion which rotatably fits in the bore of a box 83 which surrounds the pin and is slidable in the slot 64a of the lever. A washer 84 holds all of these parts in position. Means is provided for controlling the vertical position of the wedge member 80 so as to change the position of the pivot 65 relative to the lever 64. This comprises an adjusting stud extending vertically upward from the wedge member 80 and having threaded engagement with an adjusting nut 86 which has an annular recess receiving the plate 82 so that the nut 86 is held against vertical movement. Thus by turning the nut 86, the rod 85 is moved upwardly and downwardly. This adjusts the position of the wedge member 80 in the bracket 66. This carries the pivot 65 upwardly and downwardly in the slots 64a of the lever 64 so as to change the relative length of the arm 63, 65 as compared with the lever arm 65, 67. Since the lead screw 38 is of a fixed thread and rotates at a predetermined number of revolutions per minute, it is obvious that the variation of the lever arms 63, 65 and 65, 67 will vary the rate at which the control ring 17 is moved toward the right as viewed in Fig. 1 during the cutting of a taper thread. In other words, it will control the inclination of the taper. A gauge rod 87 extending vertically upwardly from the upper face of the wedge member 80 passes through an opening in the plate 82 and may be suitably marked to indicate the taper being cut at any adjustment of the pivot 65.

In the operation of my machine, a work piece 29 is first clamped in the jaws 30 of the carriage 31, the bolt at 65 is loosened and the nut 86 adjusted for the desired taper after which the bolt 65 is again tightened, the driving sleeve 75 is properly positioned on the rod 62 and the throwout rod 57 is properly positioned in bracket 58. The operation then proceeds as has already been described.

What I claim is:

1. A taper thread cutting machine, comprising a frame, a rotatable die head mounted therein and provided with radially adjustable taper thread cutting dies and an annularly grooved ring for adjusting them, a carriage mounted upon the frame for movement longitudinally thereof toward and from the die head and provided with means for supporting work to be threaded, a support mounted upon the frame in a zone opposite the grooved ring and carrying a pivot pin, a two armed lever pivotally mounted upon said pin, an endwise reciprocable control rod extending from one arm of said lever to the carriage, releasable means for connecting the rod to the carriage, operating mechanism connecting the other arm of the lever to said grooved die adjusting ring, and cooperating relatively movable parts, one fixed on the frame and a second carried by and movable with the carriage, the second of said parts being operativey connected to said releasable means and actuated by the first part as the carriage moves toward the die head, thereby to terminate the die adjusting operation.

2. The combination of claim 1 wherein said pivot pin provides a fulcrum intermediate the two arms of said lever, in combination with a block carrying said pivot pin, said block having an interlocking slidable connection with said support, and positively adjustable means operatively connected with said support and said block for maintaining various adjusted positions of said block in said support, whereby to vary the taper of the thread cut by said dies.

3. A taper thread cutting machine comprising a frame, a rotatable die head mounted therein and provided with radially movable taper thread cutting dies and positive means for moving said dies inwardly, biasing means for urging said dies outwardly, a work-supporting carriage movable along said frame relative to said head for feeding a work piece through said dies, a rotatable lead screw mounted in said frame for moving said carriage toward said head, lead screw nuts mounted on said carriage for releasably locking said carriage to said screw, release means on said carriage for causing unlocking of said nuts from said screw, a control rod having an operative connection with said positive die-moving means and a releasable lock connection with said carriage arranged to move said dies inwardly by approach movement of said carriage toward said head, a throwout rod fixed to said frame and having a free end approached by said carriage as it moves toward said head, and operative connections between the free end of said throwout rod and said release means and said releasable lock connection arranged to cause unlocking of said nuts from said screw and to release said lock connection by approach movement of said carriage toward said head, whereby to stop the feeding of the work piece toward said head and to release said dies for biasing outwardly.

4. The combination of claim 3 wherein said biasing means for urging said dies outwardly comprises a rod operatively connected with and movable with said positive die moving means, and a spring mounted on said frame engageable and loaded by said rod during inward die movement operation of said die moving means, whereby said spring causes outward movement of said dies when the latter are released.

5. A taper thread cutting machine, comprising a frame, a radially adjustable thread cutting tool, means to radially adjust the tool, a carriage mounted upon the frame for movement longitudinally thereof toward and from the thread cutting tool and provided with means for supporting work to be threaded, means to provide relative rotation between the thread cutter and the work, a support mounted upon the frame in a zone opposite the tool adjusting means and carrying a pivot pin, a two armed lever pivotally mounted upon said pin, an endwise reciprocable control rod extending from one arm of said lever to the carriage, releasable means for connecting the rod to the carriage, operating mechanism connecting the other arm of the lever to said tool adjusting means, and cooperating relatively movable parts, one fixed on the frame and a second carried by and movable with the carriage, the second of said parts being operatively connected to said releasable means and actuated by the first part as the carriage moves toward the threading tool, thereby to terminate the adjusting operation.

6. A taper thread cutting machine comprising a frame, a radially adjustable thread cutting tool mounted thereon, means to radially move the tool, a work-supporting carriage movable along said frame relative to said tool for feeding a work piece to said threading tool, means to provide relative rotation between the thread cutter and the work piece, a rotatable lead screw mounted in said frame for moving said carriage toward said tool, lead screw nuts mounted on said carriage for releasably locking said carriage to said screw, release means on said carriage for causing unlocking of said nuts from said screw, a control rod having an operative connection with said tool moving means and a releasable lock connection with said carriage arranged to move said tool radially by approach movement of said carriage toward said tool, a throwout rod fixed to said frame and having a free end approached by said carriage as it moves toward said tool, and operative connections between the free end of said throwout rod and said release means and said releasable lock connection arranged to cause unlocking of said nuts from said screw and to release said lock connection by approach movement of said carriage toward said tool, whereby to stop the feeding of the work piece toward said tool and to move the threading tool away from the work.

ADOLPH GIRZ.

REFERENCES CITED

The following references are of record in the file of this patent:

UNITED STATES PATENTS

| Number | Name | Date |
|---|---|---|
| 883,561 | Neville | Mar. 31, 1908 |
| 1,144,333 | Offerman | June 22, 1915 |
| 1,251,209 | Fisher | Dec. 25, 1917 |
| 1,576,652 | Hall | Mar. 16, 1926 |
| 1,967,508 | Hibbard | July 24, 1934 |
| 2,054,028 | Benninghoff | Mar. 16, 1926 |
| 2,116,639 | Protin | May 10, 1938 |
| 2,286,715 | Cheever | June 16, 1942 |

FOREIGN PATENTS

| Number | Country | Date |
|---|---|---|
| 411,579 | France | June 20, 1920 |
| 300,389 | Great Britain | Nov. 15, 1928 |
| 438,549 | Great Britain | Nov. 19, 1935 |